United States Patent
Kathmann et al.

(10) Patent No.: US 9,003,149 B2
(45) Date of Patent: Apr. 7, 2015

(54) TRANSPARENT FILE SYSTEM MIGRATION TO A NEW PHYSICAL LOCATION

(75) Inventors: Kevin J. Kathmann, Rochester, MN (US); Alexei L. Pytel, Rochester, MN (US); Steven J. Simonson, Rochester, MN (US); Bruce W. Talbott, Rochester, MN (US); Thomas J. Wasik, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 13/116,847

(22) Filed: May 26, 2011

(65) Prior Publication Data

US 2012/0303913 A1  Nov. 29, 2012

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |

(52) U.S. Cl.
CPC ............ *G06F 3/0607* (2013.01); *G06F 3/0647* (2013.01); *G06F 3/0689* (2013.01)

(58) Field of Classification Search
USPC ........................................................ 711/165
See application file for complete search history.

(56) References Cited

U.S. PATENT DOCUMENTS

| | | | | |
|---|---|---|---|---|
| 6,466,328 B1 * | 10/2002 | Bradley et al. | ............... | 358/1.15 |
| 7,171,532 B2 | 1/2007 | Kodama | | |
| 7,415,591 B1 * | 8/2008 | Todd et al. | ................... | 711/170 |
| 7,539,828 B2 * | 5/2009 | Lomnes | ....................... | 711/163 |
| 7,546,482 B2 * | 6/2009 | Blumenau et al. | ........... | 714/5.11 |
| 7,577,693 B2 | 8/2009 | Aden et al. | | |
| 7,643,160 B2 | 1/2010 | Kadota | | |
| 7,685,382 B2 | 3/2010 | Andrews et al. | | |

(Continued)

FOREIGN PATENT DOCUMENTS

| | | |
|---|---|---|
| JP | 2005216304 A | 8/2005 |
| JP | 2007102675 A | 4/2007 |
| JP | 2010097533 A | 4/2010 |

OTHER PUBLICATIONS

IBM et al. "Migration from Spool file Archive to Common Server"; Mar. 25, 2011; pp. 1-133.

(Continued)

*Primary Examiner* — Michael Alsip
(74) *Attorney, Agent, or Firm* — Cantor Colburn LLP; William A. Kinnaman, Jr.

(57) ABSTRACT

Transparent file system migration including a method that identifies a source physical storage location in a file system that supports simultaneous access by multiple independent processes. A target physical storage location in the file system is identified and its contents are migrated to the target physical storage location. The migrating includes disallowing new allocations to the source physical storage location and copying contents from the source physical storage location to the target physical storage location. A write request to write data to the source physical storage location is received prior to or during the migrating. The write request is serviced contemporaneously with the migrating. Read and write requests directed to the source physical storage location are redirected to the target physical storage location. The redirecting is responsive to the migrating completing. The requests are from the multiple independent processes and include both logical and physical input/outputs.

21 Claims, 8 Drawing Sheets

(56) References Cited

U.S. PATENT DOCUMENTS

| | | |
|---|---|---|
| 7,768,665 B2 | 8/2010 | Kadota |
| 8,261,254 B2 * | 9/2012 | Cook .......................... 717/168 |
| 8,407,436 B2 * | 3/2013 | Arakawa .................... 711/162 |
| 2005/0172072 A1 | 8/2005 | Cochran et al. |
| 2005/0243368 A1 | 11/2005 | Sedky et al. |
| 2006/0149889 A1 * | 7/2006 | Sikha ........................ 711/100 |
| 2006/0179170 A1 * | 8/2006 | Kodama ........................ 710/8 |
| 2006/0288181 A1 * | 12/2006 | Wyles ........................ 711/163 |
| 2009/0138530 A1 | 5/2009 | Yao et al. |
| 2009/0249005 A1 | 10/2009 | Bender et al. |
| 2010/0100696 A1 | 4/2010 | Suzuki |
| 2010/0115205 A1 | 5/2010 | Brown et al. |
| 2010/0131728 A1 | 5/2010 | Miyamae et al. |
| 2010/0174878 A1 * | 7/2010 | Davis et al. .................. 711/161 |
| 2010/0332458 A1 | 12/2010 | Xu et al. |
| 2011/0078395 A1 | 3/2011 | Okada et al. |

OTHER PUBLICATIONS

IBM et al.; "Multi-Access Spool for Virtual Machine/System Product"; pp. 1-5; Original Publication Date: Apr. 1, 1982; IP.com Electronic Publication Date: Feb. 9, 2005.

UK International Search Report and Written Opinion for International Application No. PCT/IB2012/052598; International Filing Date: May 24, 2012; Date of mailing: Aug. 14, 2012, 3 pages.

* cited by examiner

TRANSPARENT FILE SYSTEM MIGRATION TO A NEW PHYSICAL LOCATION

BACKGROUND

The present invention relates to file systems, and more specifically to transparent file system migration to a new physical location.

Most modern operating systems provide a way to store print ready objects in their file system and to send them to the printer asynchronously. This allows applications that create print objects to continue processing before the printer actually prints the output. This process is referred to as SPOOLing (simultaneous peripheral operations on-line), and the data stored is referred to as the SPOOL. The SPOOL can also be used to store information that is arriving at a system from input peripheral devices such as networking devices.

In a multi-image operating system environment (e.g., multiple operating systems in a coupled environment) there is an advantage to sharing a single SPOOL amongst all operating system images. One advantage is that it allows processes on one image to access peripherals on other images. In the shared environment, the SPOOL is simultaneously being accessed (written to and read from) from multiple processes (threads) on multiple independent operating system images.

A SPOOL can be implemented as a series of files in the native file system of the operating system. However, it can also be implemented as a new logical file system mapped over the native file system of the operating system. This is often done to overcome native file system limitations, restrictions, and/or performance issues. Files in the SPOOL file system are generally temporary in nature, written and read once, and they can be very large. In a large operating system, the SPOOL can span multiple physical/logical storage devices in order to accommodate not just the size of objects placed in the SPOOL, but also the required performance characteristics.

A SPOOL that is implemented as a file system mapped onto objects in the native file system of the operating system can be thought of as a logical file system (LFS). Like any file system, there is a requirement to expand and contract the space available for SPOOL files. Increasing space can be accomplished by added a new native file system object to the SPOOL. Contracting the SPOOL would then require the removal of a native file system object from the SPOOL. However, before a native file system object can be removed, all the SPOOL files that reside on that object must be removed from the object. The traditional way to do this is to mark the native file system object as unavailable for new SPOOL data sets, and then, since SPOOL files are temporary, wait for the SPOOL files that are located on this object to be deleted. Once all SPOOL files that use the object are deleted, the native file system object can be removed from SPOOL and deleted.

SUMMARY

An embodiment is method that includes identifying a source physical storage location in a file system that supports simultaneous access by multiple independent processes. A target physical storage location in the file system is identified and contents of the source physical storage location are migrated to the target physical storage location. The migrating includes disallowing new allocations to the source physical storage location and copying contents from the source physical storage location to the target physical storage location. A write request to write data to the source physical storage location is received prior to or during the migrating. The write request is serviced contemporaneously with the migrating. Read and write requests directed to the source physical storage location are redirected to the target physical storage location. The redirecting is responsive to the migrating completing. The requests are from the multiple independent processes and include both logical input/outputs (I/Os) and physical I/Os.

Another embodiment is a system that includes a processor configured to perform a method. The method includes identifying a source physical storage location in a file system that supports simultaneous access by multiple independent processes. A target physical storage location in the file system is identified and contents of the source physical storage location are migrated to the target physical storage location. The migrating includes disallowing new allocations to the source physical storage location and copying contents from the source physical storage location to the target physical storage location. A write request to write data to the source physical storage location is received prior to or during the migrating. The write request is serviced contemporaneously with the migrating. Read and write requests directed to the source physical storage location are redirected to the target physical storage location. The redirecting is responsive to the migrating completing. The requests are from the multiple independent processes and include both logical input/outputs (I/Os) and physical I/Os.

A further embodiment is a computer program product that includes a tangible storage medium readable by a processing circuit and storing instructions for execution by the processing circuit for performing a method. The method includes identifying a source physical storage location in a file system that supports simultaneous access by multiple independent processes. A target physical storage location in the file system is identified and contents of the source physical storage location are migrated to the target physical storage location. The migrating includes disallowing new allocations to the source physical storage location and copying contents from the source physical storage location to the target physical storage location. A write request to write data to the source physical storage location is received prior to or during the migrating. The write request is serviced contemporaneously with the migrating. Read and write requests directed to the source physical storage location are redirected to the target physical storage location. The redirecting is responsive to the migrating completing. The requests are from the multiple independent processes and include both logical input/outputs (I/Os) and physical I/Os.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
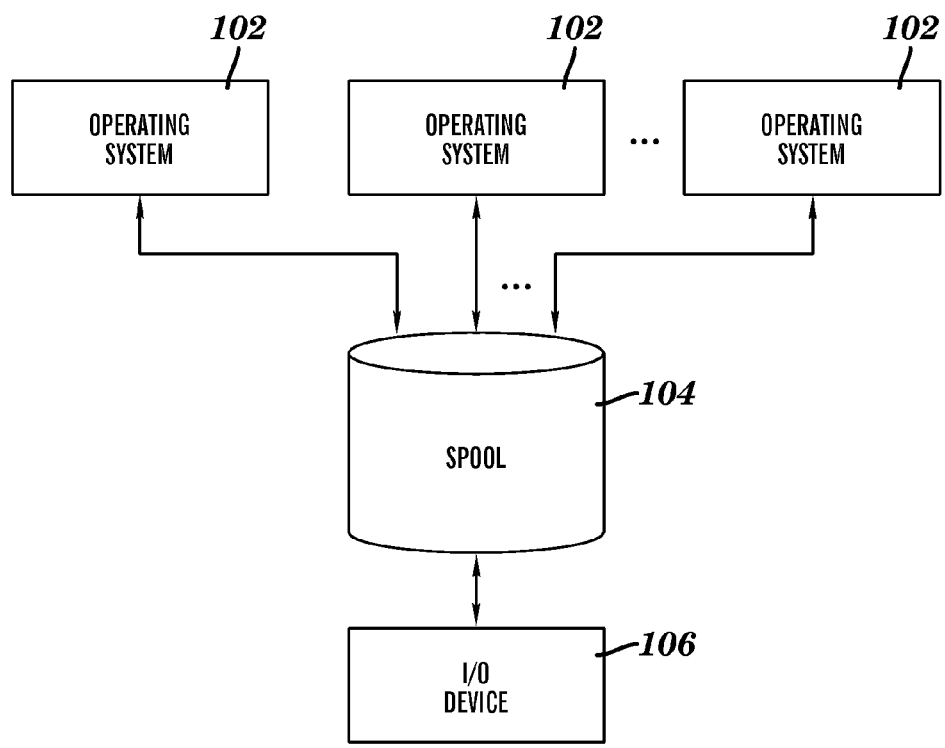
FIG. 1 depicts a system implemented in accordance with an embodiment.

An embodiment includes a method to copy data from an existing native file system object in a SPOOL file system to available space on another object defined to the SPOOL file system. The copying occurs without the knowledge of running applications and uses a re-direction scheme (e.g., a transposer) that maps SPOOL data addresses from a source object to a target object. At the completion of the copy process, the data that was on the original native file system object in the SPOOL is virtualized onto another existing object associated with the SPOOL and the source native file system object is deleted. The virtualized object continues to exist until all users of the object are deleted. Free space in the virtualized (mapped) object is available through the non-virtualized target object.

This allows the physical space used by the SPOOL to be contracted (the native file system object deleted) without having to wait for all of the SPOOL files inside the logical (virtualized) SPOOL object to be deleted. Active SPOOL files (those being read or written by active threads or processes) are handled without impacting the applications that are using the SPOOL files. In addition, an embodiment handles applications that have knowledge of the location of data within the SPOOL (have a SPOOL data address within the SPOOL logical file system) and allows them to address the data after the SPOOL has been contracted. Applications continue to use logical addresses which address the "old" SPOOL object. This "old" SPOOL object still exists as a virtualized object mapped inside another physical SPOOL object and the applications perform I/Os using "old" addresses. The mapping feature integrated in the SPOOL I/O function is capable of recognizing the virtualized environment and the target physical I/O to the correct physical native object of the OS. In addition, the "old" SPOOL object will cease to exist once all applications using the "old" SPOOL volume finish processing.

The support of both types of applications prevents the simple process of relocating SPOOL files within the SPOOL logical file system (LFS) because active processes would not be able to continue processing the data that has been relocated and SPOOL data addresses known to applications will no longer be valid if the data is relocated.

An embodiment is utilized in an environment that includes multiple coupled operating systems and SPOOL data being accessed from multiple processes (threads) on these operating systems.

An embodiment described herein allows immediate disposition of the native OS object used to house a spool object. This allows replacement of a disk drive device without impacting the data stored in the SPOOL. In addition, the applications are not impacted, as no changes to SPOOL "pointers" within applications and other SPOOL data are necessary when the disk drive device is removed.

An embodiment supports both a LFS that is mapped to a native file system (such as a SPOOL) as well as a LFS that is mapped to a physical file system (PFS) spread over multiple physical devices.

An embodiment is directed to migrating a logical file system (LFS) that is based on a set of physical volumes, to a new set of physical volumes in a transparent and non-disruptive manner. Several key features of the LFS are maintained during and after the migration process. For example, the data addressing scheme used by applications to access data in the LFS is preserved. Data addresses are automatically and transparently transposed to access proper physical volumes during and after the migration process. In addition, source and target physical volumes can be defined with different geometries, and the transposing process automatically takes these differences into account when generating physical data addresses. Further, no changes to application data or application code are required, as I/O operations are automatically redirected to the correct target physical volume. When necessary, I/O operations are transparently retried as data is migrated from a source physical volume to a target physical volume. Further, concurrent access to the data in the LFS from multiple processes running on multiple, tightly coupled computer systems is supported throughout the migration progress. Still further, multiple physical volumes may be merged onto a single physical volume without changes to data or applications, thus potentially simplifying volume management tasks.

As used herein, the term "SPOOL file system" or simply "SPOOL" refers to the logical container for SPOOL data produced by system and application processes running in a distributed computer system. The SPOOL file system manages space allocation/deallocation requests from multiple processes. In addition, the SPOOL file system provides concurrent access to spool data from multiple processes running on multiple tightly coupled computer systems. This multiple access to SPOOL data is an important feature of the SPOOL file system. As used herein, the term "tightly coupled computer system" refers to a distributed computer system containing multiple physically separate OS images that have symmetrical access to the shared data and that present a single system image to applications (e.g., a Sysplex running on an IBM System Z®).

A SPOOL file system includes one or more SPOOL volumes that can be separately managed (operational management). As used herein, the term "SPOOL volume" refers to a logical entity that is mapped in a certain way to data management components of the underlying operating system. In contemporary operating systems, a single logical SPOOL volume is mapped to a single physical dataset on a physical disk volume in a one-to-one relationship. In embodiments described herein, multiple logical SPOOL volumes can be mapped to a single physical dataset in a many-to-one relationship as a result of migration.

As used herein, the term "migration" refers to the movement of data from one SPOOL volume to another SPOOL volume. The "from" SPOOL volume is referred to herein as a "source volume", and the "to" SPOOL volume is referred to herein as a "target volume." Runtime input/output (I/O) to migrating SPOOL volumes is transparently handled by embodiments described herein. It should be noted, that embodiments described herein may be extended to any type of file system.

As used herein, the term "runtime" refers to single or multi-threaded user execution context running a user application and with potential of performing I/O to SPOOL volumes. Runtime incorporates a low level interface that enables communication with a migrator execution context. As described herein, the SPOOL file system provides centralized management of SPOOL space, however runtime I/O is decentralized. The SPOOL file system directs and coordinates access to SPOOL data, but for the actual access to physical devices, the data management facilities of the underlying operating system are used. The runtime I/O uses a flat addressing scheme to access individual data records in the SPOOL file system. The mapping of a logical address of a record to a physical location is performed transparently for the application, including when migration is in progress and when the logical record is moved between the physical volumes.

As used herein, the term "migrator" refers to a single or multi-thread execution context that coordinates all phases of the migration. As mentioned above, hooks exist in the runtime to report into the migrator before performing any I/O on the migrating volumes. The migrator provides instructions back to runtime, with the actual I/O staying within the runtime execution context. In an embodiment, each migrator represents a migration.

As used herein, the term "assistant" refers to a single or multi-threaded execution context working in concert with the migrator to extend migration capabilities amongst tightly coupled computer systems. In an embodiment, each image in the tightly coupled computer system hosts an assistant, and one assistant may handle multiple migrations. The assistant, with direction from the migrator, coordinates migration phase transitions.

As used herein, the term "track bitmap" refers to a bitmap that is created in the setup phase and represents the source tracks that must be migrated from a source SPOOL volume to a target SPOOL volume. It should be noted that an embodiment uses a track as a smallest storage unit, but embodiments can support any storage unit type (e.g. records).

As used herein, the term "runtime bitmap" refers to a bitmap used to determine whether communication is required with the migrator before performing I/O to the source SPOOL volume. In an embodiment, the granularity of the runtime bitmap is a track.

As used herein, the term "re-migrate bitmap" refers to a bitmap used to determine which tracks may need to be re-migrated during a second phase. In an embodiment, the migrator, in concert with the runtime, tallies which track(s) may need to be re-migrated and stores this information in the re-migrate bitmap. In an embodiment, the re-migrate bitmap is also used to provide restart and takeover capabilities on any system within the tightly coupled complex.

FIG. 1 depicts a system implemented in accordance with an embodiment. As shown in FIG. 1, one SPOOL subsystem 104 is used simultaneously by several operating systems 102. The SPOOL subsystem 104 shown in FIG. 1 also interfaces to an I/O device 106. In an embodiment, the operating systems 102 are executing on processors that are part of a multi-processor computer system. The I/O device 106 includes (or is an interface to) any peripheral device(s) (e.g., printer, hard disk drives, personal computers, etc.) as well as any networks (Internet, local area network, etc.). The SPOOL subsystem 104 shown in FIG. 1 may be used in any way known in the art and is typically used to store large datasets. The data in the SPOOL subsystem 104 includes data that is being transferred from an operating system 102 to an I/O device 106, and data that is being received by the operating system 102 from an I/O device 106.

Figure 2:
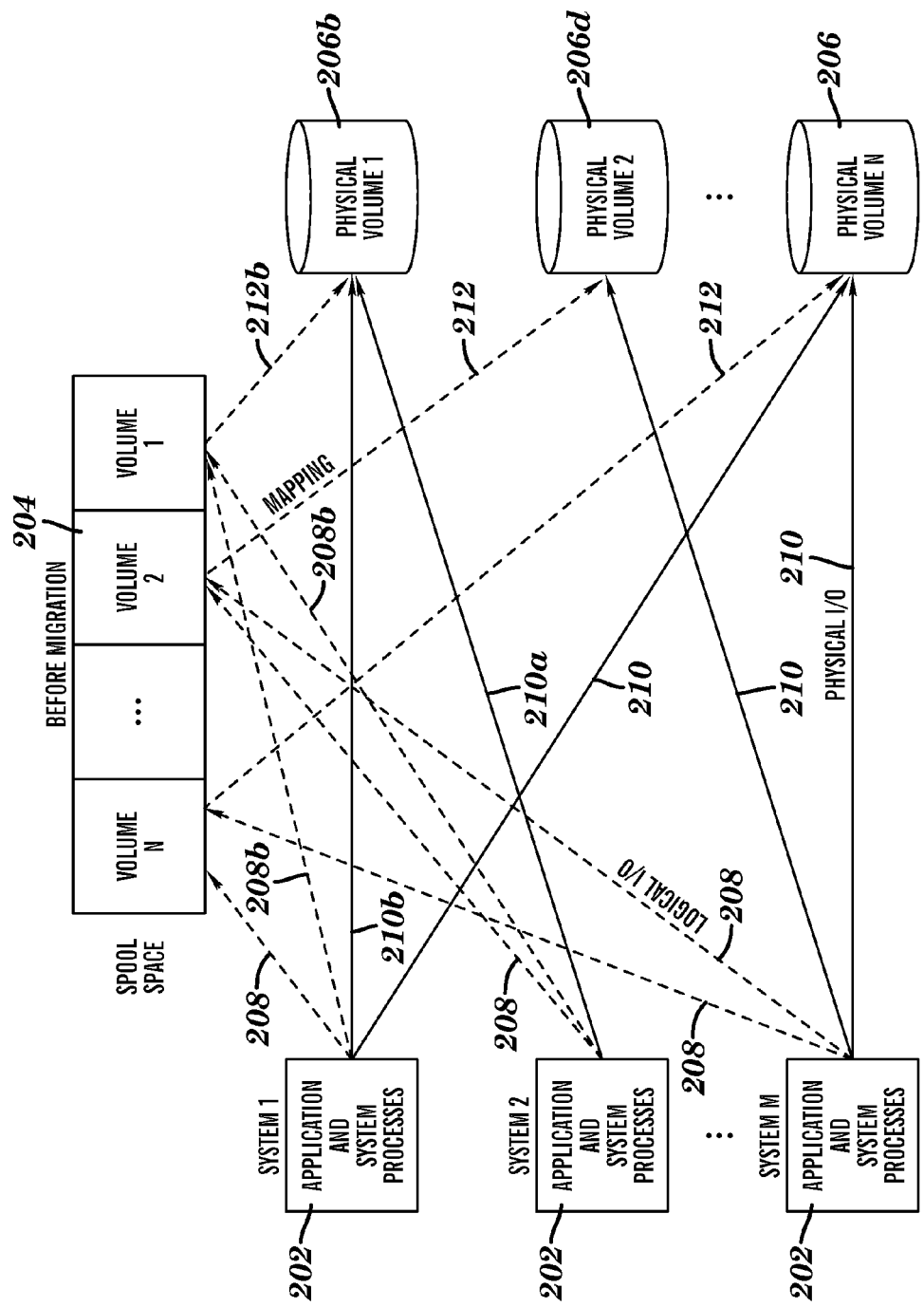
FIG. 2 depicts a spool file system prior to migration in accordance with an embodiment.

FIG. 2 depicts a spool file system prior to migration in accordance with an embodiment. There are "M" systems 202 executing applications and system processes shown in FIG. 2, "N" physical SPOOL volumes 206 (e.g., native file system objects) and "N" logical SPOOL volumes managed by a SPOOL subsystem mapping 204. As shown in FIG. 2, one logical SPOOL volume in the SPOOL subsystem mapping 204 corresponds to each physical SPOOL volume 206. FIG. 2 shows logical I/Os 208 by the systems 202 to the SPOOL and physical I/Os 210 by the systems to the physical SPOOL volumes. FIG. 2 also depicts mappings 212 by the spool subsystem mapping 204 of the logical I/Os 208 to the physical SPOOL volumes 206.

As shown in FIG. 2, there are two physical I/Os 210a and 210b to physical SPOOL volume 206b. In addition, there are two logical I/Os 208b to physical SPOOL volume 206b. The two logical I/Os 208b are translated into a physical address that is located on physical SPOOL volume 206b as shown by mapping 212b. As used herein, the term "physical I/O" refers to an I/O operation which accesses physical media where the data physically resides. Thus, for physical I/Os applications perform I/O directly to native OS file system objects. As used herein, the term "logical I/O" refers to an I/O operation that accesses data stored in the SPOOL subsystem by using a mapping 204 to translate a logical address into a physical address located on a physical spool volume 206. In order to fulfill the request, the SPOOL subsystem performs a physical I/O to actual physical media on behalf of the requestor.

Figure 3:
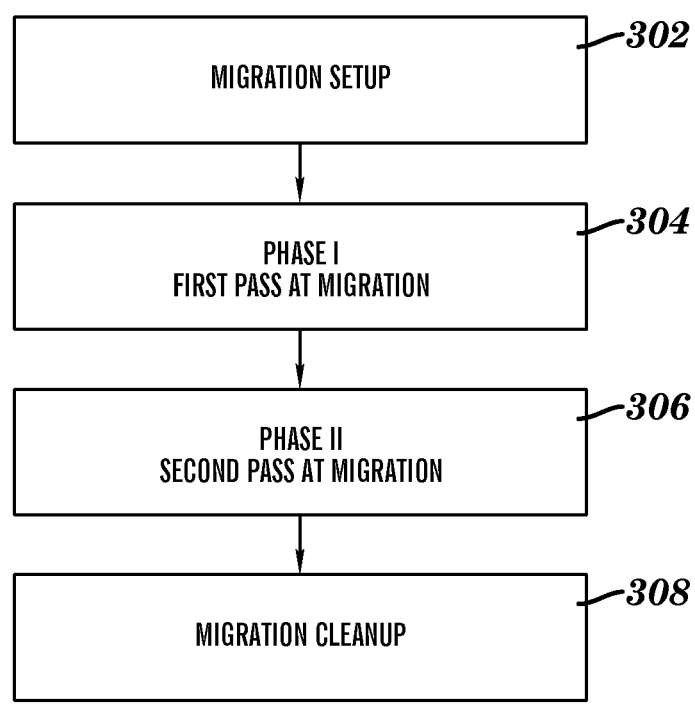
FIG. 3 depicts an overall process flow that is implemented in accordance with an embodiment.

As shown in FIG. 3, an embodiment includes a four-phase migration process. First, migration setup that includes identifying source/target physical SPOOL volumes and initializing data and systems for migration is performed at block 302. At block 304, phase one of the migration occurs and it includes a performing a first migration pass where tracks are copied from the source to the target as well as identifying tracks that require re-migration. At block 306, phase two of the migration is performed and it includes a second migration pass where any tracks identified as requiring re-migration are copied from the source to the target. At block 308, migration clean-up is performed to complete the migration.

Figure 4:
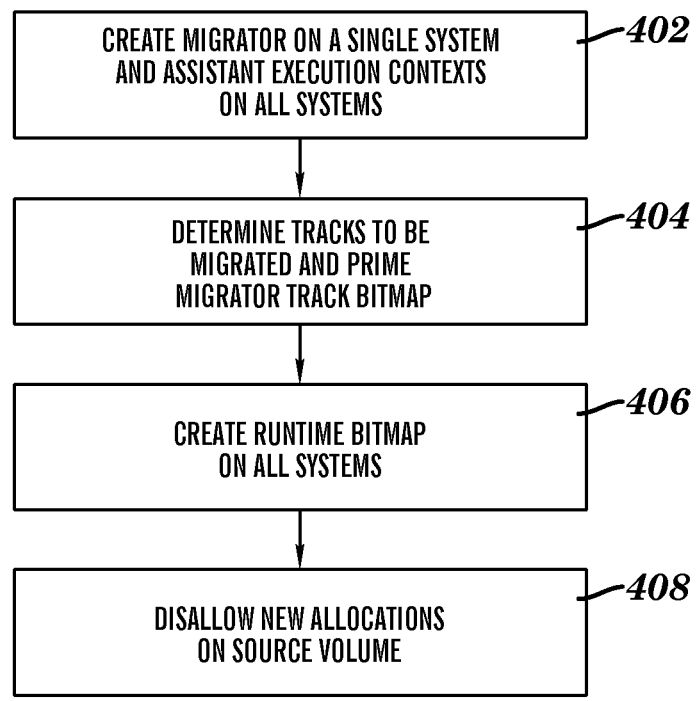
FIG. 4 is a process flow of a migration setup phase in accordance with an embodiment.

FIG. 4 is a process flow of a migration setup in accordance with an embodiment to migrate from a source physical SPOOL volume to a target physical SPOOL volume. At block 402, a migrator execution context is created on a single system that will control the migration, and assistant execution contexts are created on each of the systems. At block 404, it is determined what tracks are required to be migrated, and a migrator track bitmap is generated (or primed). In addition, a runtime bitmap is created on each of the systems in the complex that access the SPOOL at block 406. The runtime bitmap is created with all bits turned on in order to inform the runtime to report to the migrator before performing any I/O on the source volume. At block 408, new allocations on the source volume are disallowed.

As used herein, the term "transition count" refers to a count by the migrator to manage phase one and phase two transitions between the migrator context and the runtime context. The transition count is associated with the source volume and exists on all systems within the tightly coupled complex. At opportune times the migrator informs assistants to increase the transition count by one (or some other fixed value). An example of an opportune time is the transition of the migrating volume from one state to another state. In embodiments, the transition count is updated when the migration process makes changes that can affect I/O operations. Given an I/O, the runtime context captures a copy of the transition count before each I/O, performs the I/O and then compares a copy of a current transition count to the original transition count to see if a redo is required. In an embodiment, a redo is required whenever the transition count changes. The purpose of the transition count is to signal to runtime that a redo is required for an inflight I/O. A redo might be required, for example, if a prior decision of the runtime I/O to perform physical I/O on a source volume is not longer valid and this same logical I/O should now address a target physical volume. On a redo, the runtime context sends another message to the migrator context for instructions. This allows the migrator to inform the runtime when the I/O switches from the source to the target. Use of the transition count is used to avoid serialization of each runtime I/O operation with the migrator process, which can be costly. The runtime uses the transition count to detect changes in the state of the volume and to redo an I/O operation if the change was detected during the I/O operation.

During migration, data is moved from a source physical volume to a specific location on target physical volume. Given a source track address, the mapped value may be applied to the source address to obtain the exact location of the data on the target physical volume. Thus, the application does need not be concerned about addressing differences during the migration.

Figure 5:
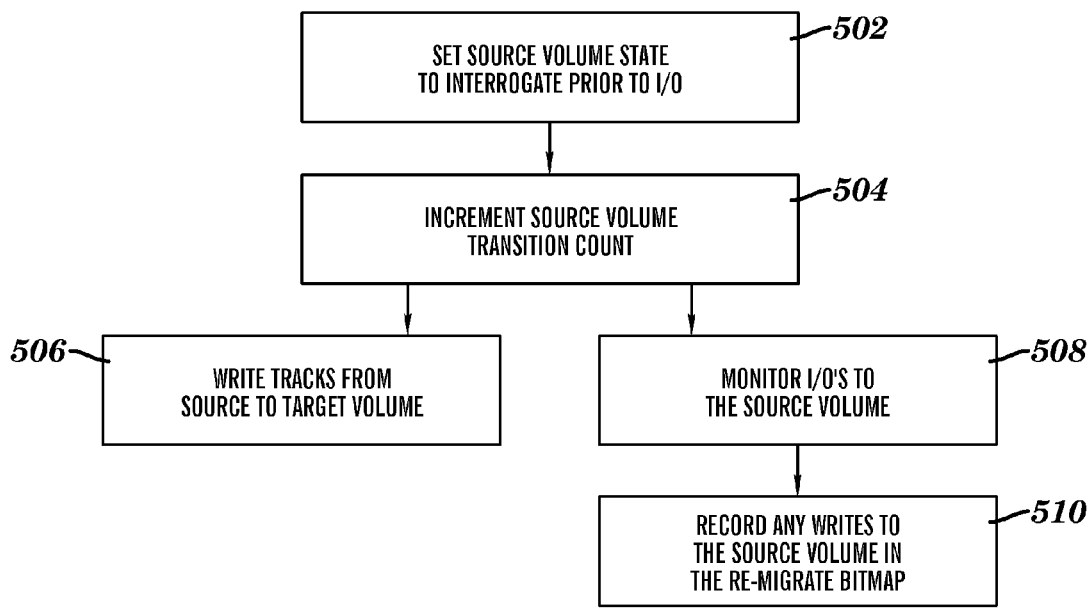
FIG. 5 depicts a process flow of a first phase in a migration in accordance with an embodiment.

FIG. 5 depicts a process flow of a first phase of a migration in accordance with an embodiment. During this phase, data is copied from the source volume to the target volume as quickly as possible without disrupting runtime I/O to the source volume or the target volume. Before writing to the source volume, the runtime context notifies the migrator context of the impending write. The migrator records the write in the re-migration bitmap so these tracks may be re-migrated in phase two. At block 502, the migrator informs the assistants to set the source volume state such that runtime will interrogate the runtime bitmap before reading or writing a track to the associated source volume. At block 504, the assistants increment the source volume transition count. At block 506, the migrator proceeds to write tracks from the source volume to the target volume using the track level bitmap as the guide. The track level bitmap was created in setup phase and denotes source tracks requiring migration.

While the copying in block 506 is being performed, block 508 is performed to monitor I/Os to the source volume. Thus, the migrating and servicing of write requests is performed contemporaneously. Before reading or writing a source track, the runtime interrogates the runtime bitmap. The runtime bitmap was created with all bits on in the setup phase. Given a track and a corresponding bit that is set to on, the runtime sends a request/response message to the migrator. Within the message the runtime denotes if the pending I/O is a read or write. If the message is a write, then block 510 is performed and the migrator records this fact in the re-migrate bitmap in preparation for phase two. In response to this message, the migrator informs the runtime to write to the source volume and to leave the associated bit in the runtime bitmap in the on state.

In embodiments described herein, the physical I/O happens in the runtime execution context, and communication with the migrator is relatively fast since very little processing takes place.

When the processing in block 506 is completed, phase one is completed and the migrator is ready to transition to phase two processing. Note that during the processing in block 506, the migration may be canceled without any loss of data.

Figure 6:
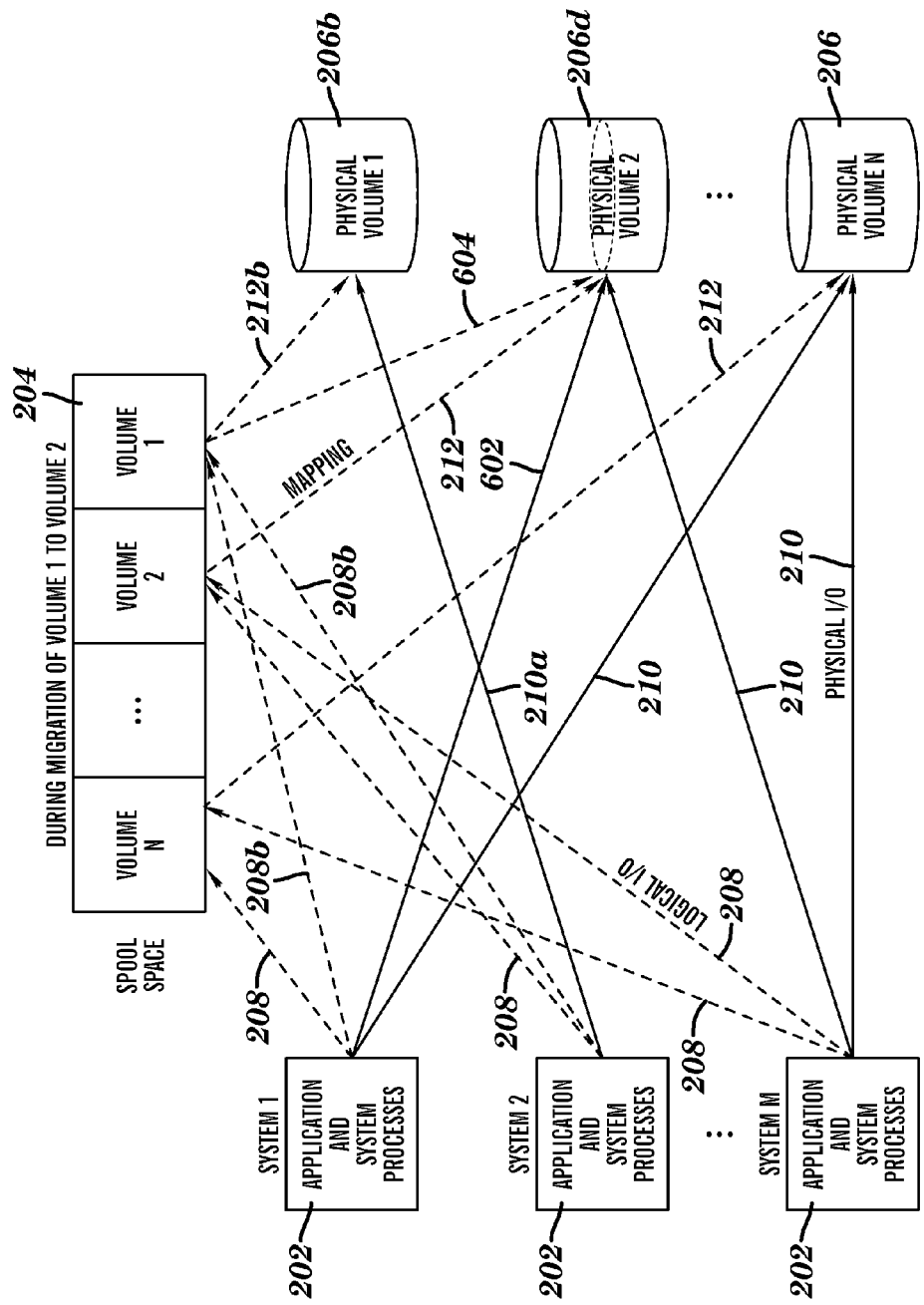
FIG. 6 depicts the SPOOL file system of FIG. 2 during a migration from one physical volume to another physical volume in accordance with an embodiment.

FIG. 6 depicts the SPOOL file system of FIG. 2 during a migration from physical volume 206b to physical volume 206d during (or at the completion of phase one) in accordance with an embodiment. As shown in FIG. 6, some of the files on physical volume 206b accessed via logical I/Os 208 have been moved to physical volume 206d and are accessed via mapping 204, while others (e.g., those that will have to be re-migrated in phase two, those that have not yet been migrated) are still located on physical volume 206b and are accessed via mapping 212b. In addition, a physical I/O 602 to physical volume 206d has been added replacing physical I/O 210b to physical volume 206b.

Before migration, volume 2 in the mapping 204 is mapped to physical volume 206d and volume 1 in the mapping 204 is mapped to physical volume 206b. During migration volume 1 in the mapping 204 has two simultaneous mappings—one is to physical volume 206b and another is to a subset of physical volume 206d. This mapping is implemented via control information maintained for volume 1 in the mapping. Depending on the state of the migration, runtime I/O will use one or another of these two mappings when issuing physical I/O for a logical I/O to volume 1 in the mapping 204. After migration, the mapping from volume 1 in the mapping 204 to physical volume 206b is removed and only mapping from volume 1 in the mapping 204 to a subset of physical volume 206d remains. Volume 1 in the mapping 204 is now virtualized because it now does not have its own physical spool volume 206.

Figure 7:
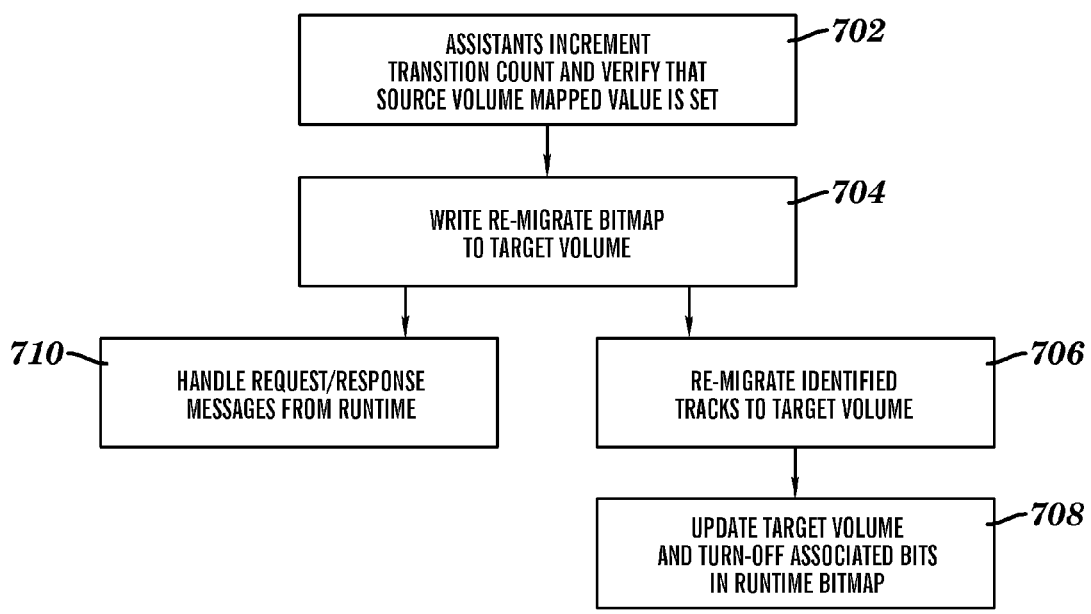
FIG. 7 depicts a process flow of a second phase of the migration in accordance with an embodiment.

FIG. 7 depicts a process flow of phase two of the migration in accordance with an embodiment. Phase two is used to re-migrate any tracks required to complete the migration. In an embodiment, for recovery purposes and also performance, the re-migrate bitmap is written to the target volume. During phase two, any tracks denoting re-migration will be handled as such and the runtime is directed by the migrator to perform physical I/O on a target volume. Once the re-migrate bitmap has been processed, phase two is complete. In an embodiment, actions are taken to insure that the migration may be restarted should the migrator context fail.

During phase two, the migrator is about to make a transition in response to runtime request/response messages. The transition will inform the runtime to use the target volume instead of the source volume. Before starting any I/O to the target, any "in flight I/Os" to the source dataset must be complete or at least a determination made that the I/O must be redone via another request/response message to the migrator. To assure this, the transition count associated with the source volume is used. At the start of the migration, the transition count is set to an arbitrary value. During migration, runtime captures this count and associates it with a unique I/O before sending a request/response to the migrator. Upon I/O completion, the runtime rechecks the stored count with a current count associated with the source volume. If the values are different, then the I/O must be redone with another request/response message to the migrator. In the response portion of the message, the migrator informs the runtime whether the I/O must be performed to the source volume or to the target volume. In phase one, all I/O was performed to the source volume. In phase two I/Os are redirected to be performed to the target volume.

As shown in block 702 of FIG. 7, at the start of phase two, the migrator sends a start phase two request out to all assistants. The assistants, on a per system basis, increment the transition count (e.g., by one). In addition, the assistants also assure that the source volume mapped value is set. The mapped value is applied to the source address, thereby producing the associated target address. Once all assistants denote completion, block 704 is performed and the migrator writes out the re-migrate bitmap to the target volume. In an embodiment, space for this bitmap is reserved early on in the setup phase.

Hardening the re-migrate bitmap to the target volume allows recovery and migrator takeover should the migrator system go down. The re-migrate bitmap can be read, and phase two seamlessly resumed. In addition, as phase two progresses, each assistant on each system reads the re-migrate bitmap from the target volume and atomically applies it to the memory runtime bitmap of its system. As described previously, the runtime bitmap directs the request/response messages to be sent to the migrator. Once tracks have been re-migrated, there is no need for the runtime to report into the migrator. Instead I/O will use the mapped value and perform I/O to the target volume. The act of reading and applying re-migrate bitmap to the runtime bitmap greatly reduces request/response communication with the migrator.

During the start of phase two, no runtime request/response messages are handled until all assistants have incremented the transition count and acknowledged (e.g., via an ACK message) the completion of the incrementing. Typically, this is instantaneous, but the algorithm must take into consideration excessive time and cancel the migration if need be. Note that up to this point the migration may be canceled as all I/O has been performed to the source volume. In an embodiment, to detect excessive wait time, the migrator uses a heartbeat timer to detect and to cancel the migration if a specified time period is exceeded. Once block 706 in FIG. 7 is started, the migration cannot be canceled since data will now span both the source and target volumes. This means that recovery mechanisms must be in place to resume the migration if a failure occurs.

At block 710, the migrator takes actions and responds to runtime request/response messages in a different manner than that used in phase one of the migration. Given track(s) in a runtime message, the migrator interrogates the re-migrate bitmap. If the tracks must be re-migrated then the source track(s) will be read and written to the associated target track before responding to the runtime message. Also the migrator turns off associated bits in the re-migrate bitmap and the bitmap change is written to the target volume. The I/O ordering between re-migrated tracks and bitmap here is important to assure the re-migrate bitmap on the target volume may be used in recovery mode should the migrator system go down. The source to target track write occurs first followed by the bitmap write to target volume. If a crash occurs after the track is written but before the bitmap is written, then the recovery code will just re-migrate the track. This assures a re-migrate action will not be missed.

Once the migrator has handled any re-migration at block 706, block 708 is performed and the response back to runtime is to update the target volume and turn off the associated bits within the runtime bitmap. By updating the runtime bitmap, the number of runtime request/response messages will steadily decrease. Of course this lessens the traffic from that one system only. In order to lessen runtime traffic from all systems, the assistants periodically read in the re-migrate bitmap from the target volume and atomically apply it to the runtime bitmap.

When the runtime updates data within the source volume, the mapped value is used to transparently transform source addresses to target volume locations. With this unique mechanism user applications are able to use existing addressing during the migration. At some point all re-migrate actions have been handled and phase two is complete.

Figure 8:
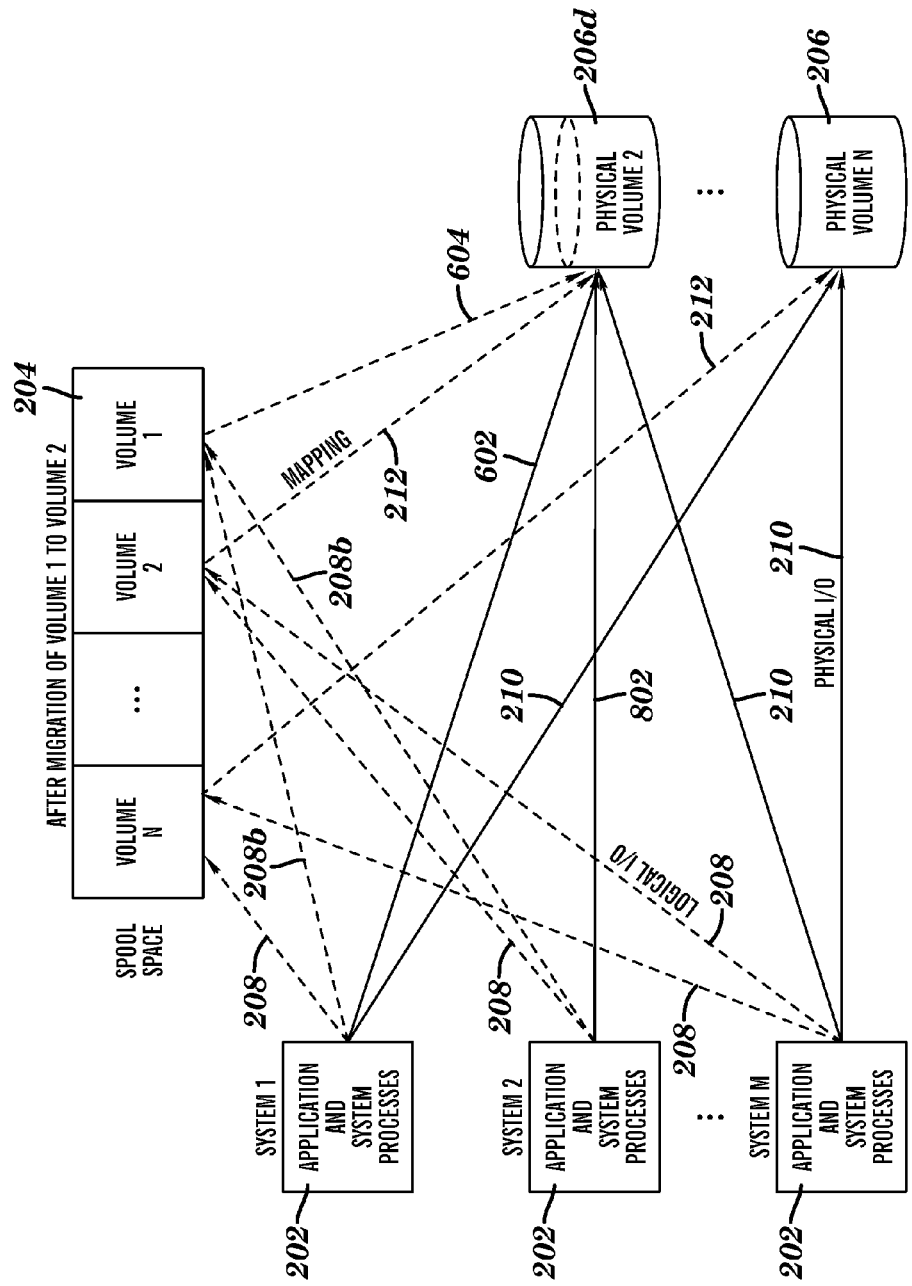
FIG. 8 depicts the SPOOL file system of FIGS. 2 and 6 after a migration from one physical volume to another physical volume is completed in accordance with an embodiment.

FIG. 8 depicts the SPOOL file system of FIGS. 2 and 6 after a migration from physical volume 206b to physical volume 206d is completed in accordance with an embodiment. As shown in FIG. 8, physical volume 206b has been removed from the SPOOL configuration. As shown in FIG. 8, all of the data previously located on physical volume 206b and accessed via logical I/Os 208 have been moved to physical volume 206d and are accessed via mapping 604. In addition, a physical I/O 802 to physical volume 206d has been added replacing physical I/O 210a to physical volume 206b. The mapping from logical volume to physical volume is stored in the control information for the SPOOL volume. The logical I/O is always performed on volume 1 in the mapping 204, but the physical I/O may go to different places depending on what this control information dictates. Though not shown in FIG. 8, any new reads or writes (logical I/O) specifying logical volume 1 in the mapping 204 will go to physical volume 206d.

In an embodiment, if the system executing the migrator context fails, one of the other systems becomes the migrator. This implementation uses a guaranteed messaging system where all runtime request/response messages are rerouted to the takeover system. With that said, the takeover-migrator must decide whether the migration should be cancelled or whether it should be resumed and finished. In an embodiment, this decision is based on whether the re-migrate bitmap was successfully written to the target volume in phase two. If it has, then the migrator rereads the re-migrate bitmap and resumes the migration in phase two mode. On the other hand, if the re-migrate bitmap has not been written, then the migration is canceled and backed out to the pre-migration state. The re-migrate bitmap provides unique recovery and performance capabilities.

Technical effects and benefits include the ability to copy data from an existing native file system object in a SPOOL file system to available space on another object defined to the SPOOL file system without the knowledge of running applications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for migrating data in a computer system that includes multiple processes running on multiple tightly coupled processors having simultaneous access to a file system comprising multiple physical storage volumes, comprising:
   identifying migration data to be migrated from a source physical storage location in the file system;
   identifying a target physical storage location in the file system to receive the migration data;
   creating a track bitmap dividing the migration data into a plurality of tracks and comprising a mapping of the tracks from the source physical storage location to the target physical storage location;
   creating a runtime bitmap identifying the migration data as located in the source physical storage location;
   creating a re-migration bitmap for recording runtime write requests to the migration data while the migration is takes place;
   migrating the migration data from the source physical storage location to the target physical storage location and supporting runtime input/output requests to the migration data while the migration takes place, the migrating comprising:
   disallowing new space allocations by the file system to the source physical storage location while the migration takes place;

performing a first migration pass where the tracks of the migration data are copied from the source physical storage location to the target physical in accordance with the track bitmap;

receiving runtime write requests to the migration data while the first migration pass takes, determining that runtime write requests affect the migration data by reference to the runtime bitmap, servicing the runtime input-output with the migration data stored in the source physical storage location, and recording the migration data affected by the runtime write requests in the re-migration bitmap; and performing a second migration pass where the migration data affected by the runtime write requests identified in the re-migration database are copied from the source physical storage location to the target physical storage location in accordance with the mapping in the track bitmap.

2. The method of claim 1, further comprising removing the source physical storage location from the file system.

3. The method of claim 1, wherein the file system is a simultaneous peripheral operations on-line (SPOOL) file system.

4. The method of claim 1, wherein the migration is performed without any changes to the multiple independent processes.

5. The method of claim 1, wherein the multiple independent processes are executing on multiple computer systems.

6. The method of claim 1, wherein the redirecting is performed using a virtualized object.

7. The method of claim 1, wherein the redirecting is performed using a logical file system.

8. A system comprising a processor configured to perform a method for migrating data in a computer system that includes multiple processes running on multiple tightly coupled processors having simultaneous access to a file system comprising multiple physical storage volumes, the method comprising:

identifying migration data to be migrated from a source physical storage location in the file system;

identifying a target physical storage location in the file system to receive the migration data;

creating a track bitmap dividing the migration data into a plurality of tracks and comprising a mapping of the tracks from the source physical storage location to the target physical storage location;

creating a runtime bitmap identifying the migration data as located in the source physical storage location;

creating a re-migration bitmap for recording runtime write requests to the migration data while the migration is takes place;

migrating the migration data from the source physical storage location to the target physical storage location and supporting runtime input/output requests to the migration data while the migration takes place, the migrating comprising:

disallowing new space allocations by the file system to the source physical storage location while the migration takes place;

performing a first migration pass where the tracks of the migration data are copied from the source physical storage location to the target physical in accordance with the track bitmap;

receiving runtime write requests to the migration data while the first migration pass takes, determining that runtime write requests affect the migration data by reference to the runtime bitmap, servicing the runtime input-output with the migration data stored in the source physical storage location, and recording the migration data affected by the runtime write requests in the re-migration bitmap; and performing a second migration pass where the migration data affected by the runtime write requests identified in the re-migration database are copied from the source physical storage location to the target physical storage location in accordance with the mapping in the track bitmap.

9. The system of claim 8, wherein the method further comprises removing the source physical storage location from the file system.

10. The system of claim 8, wherein the file system is a simultaneous peripheral operations on-line (SPOOL) file system.

11. The system of claim 8, wherein the migration is are performed without any changes to the multiple independent processes.

12. The system of claim 8, wherein the multiple independent processes are executing on multiple different computer systems.

13. The system of claim 8, wherein the redirecting is performed using a virtualized object.

14. The system of claim 8, wherein the redirecting is performed using a logical file system.

15. A computer program product comprising:

a tangible storage medium readable by a processing circuit and storing instructions for execution by the processing circuit for performing a method comprising:

identifying migration data to be migrated from a source physical storage location in the file system;

identifying a target physical storage location in the file system to receive the migration data;

creating a track bitmap dividing the migration data into a plurality of tracks and comprising a mapping of the tracks from the source physical storage location to the target physical storage location;

creating a runtime bitmap identifying the migration data as located in the source physical storage location;

creating a re-migration bitmap for recording runtime write requests to the migration data while the migration is takes place;

migrating the migration data from the source physical storage location to the target physical storage location and supporting runtime input/output requests to the migration data while the migration takes place, the migrating comprising:

disallowing new space allocations by the file system to the source physical storage location while the migration takes place;

performing a first migration pass where the tracks of the migration data are copied from the source physical storage location to the target physical in accordance with the track bitmap;

receiving runtime write requests to the migration data while the first migration pass takes, determining that runtime write requests affect the migration data by reference to the runtime bitmap, servicing the runtime input-output with the migration data stored in the source physical storage location, and recording the migration data affected by the runtime write requests in the re-migration bitmap; and performing a second migration pass where the migration data affected by the runtime write requests identified in the re-migration database are copied from the source physical storage location to the target physical storage location in accordance with the mapping in the track bitmap.

16. The computer program product of claim 15, wherein the method further comprises removing the source physical storage location from the file system.

17. The computer program product of claim 15, wherein the file system is a simultaneous peripheral operations on-line (SPOOL) file system.

18. The computer program product of claim 15, wherein the migration is performed without any changes to the multiple independent processes.

19. The computer program product of claim 15, wherein the multiple independent processes are executing on multiple different computer systems.

20. The computer program product of claim 15, wherein the redirecting is performed using a virtualized object.

21. The computer program product of claim 15, wherein the redirecting is performed using a logical file system.

* * * * *